April 21, 1936

F. H. LOFTUS

Re. 19,935

NONREVERSING OPEN HEARTH FURNACE

Original Filed Jan. 30, 1932 7 Sheets-Sheet 1

INVENTOR
Fred H. Loftus
by Christy Christy
and
Wharton
his attorneys

April 21, 1936. F. H. LOFTUS Re. 19,935
NONREVERSING OPEN HEARTH FURNACE
Original Filed Jan. 30, 1932 7 Sheets-Sheet 2
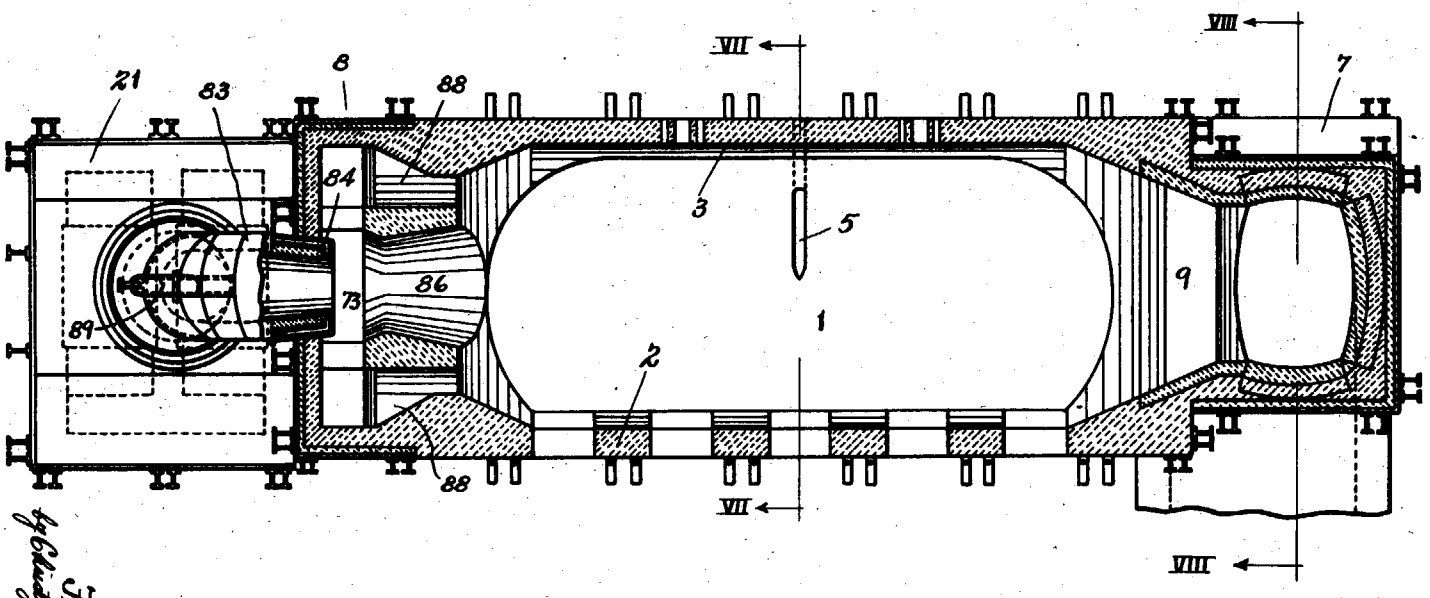
Fig. II
INVENTOR:
Fred H. Loftus
by Christy Christy & Wharton
his attorneys April 21, 1936. F. H. LOFTUS Re. 19,935
NONREVERSING OPEN HEARTH FURNACE
Original Filed Jan. 30, 1932 7 Sheets-Sheet 3
Fig. III
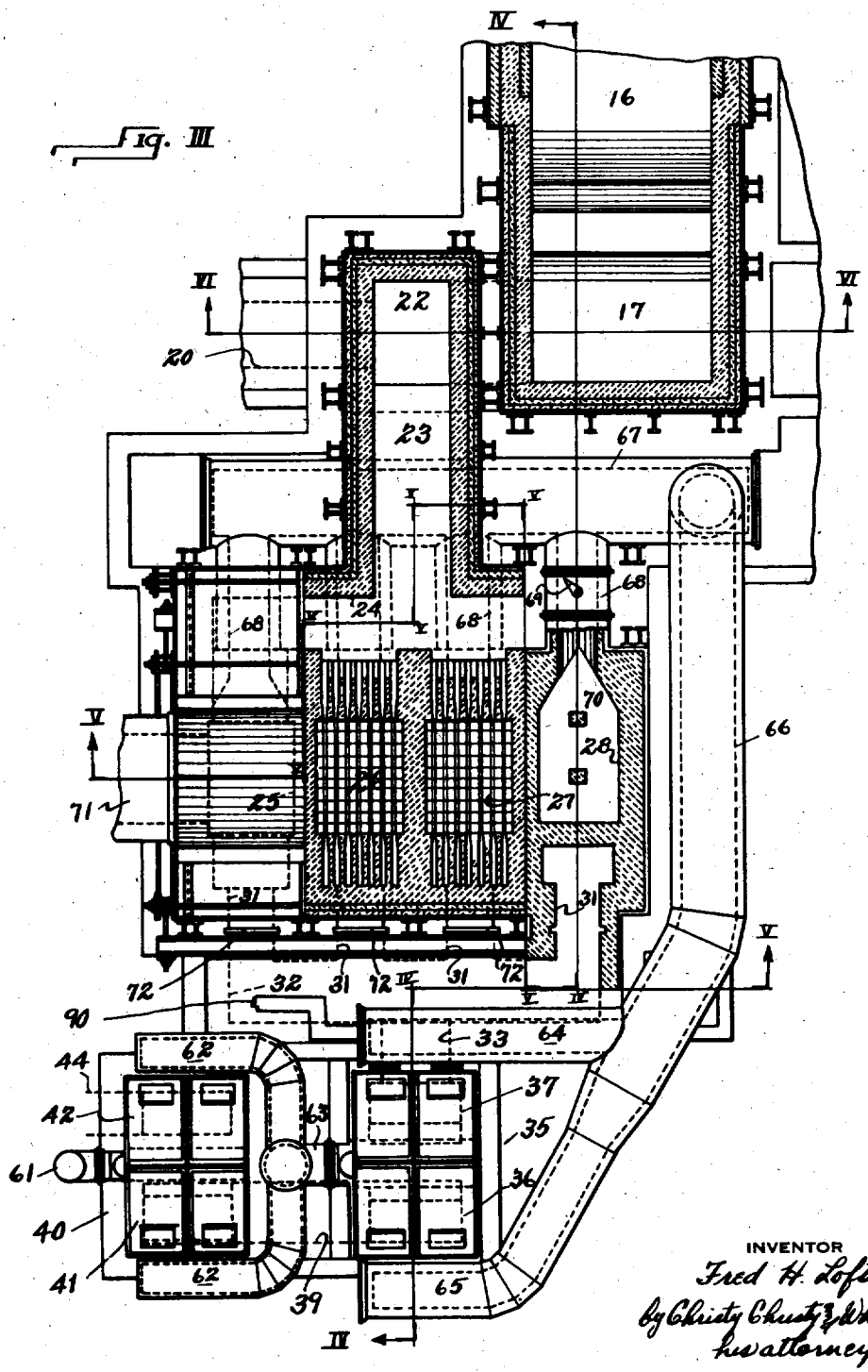
INVENTOR
Fred H. Loftus
by Christy Christy & Wharton
his attorneys April 21, 1936. F. H. LOFTUS Re. 19,935

NONREVERSING OPEN HEARTH FURNACE

Original Filed Jan. 30, 1932 7 Sheets-Sheet 4

INVENTOR
Fred H. Loftus
by Christy, Christy & Wharton
his attorneys

April 21, 1936. F. H. LOFTUS Re. 19,935
NONREVERSING OPEN HEARTH FURNACE
Original Filed Jan. 30, 1932 7 Sheets-Sheet 5
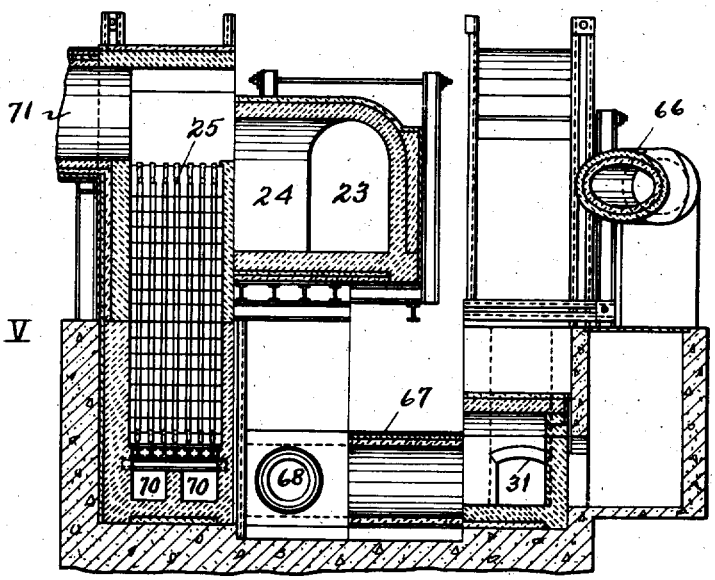
Fig. V
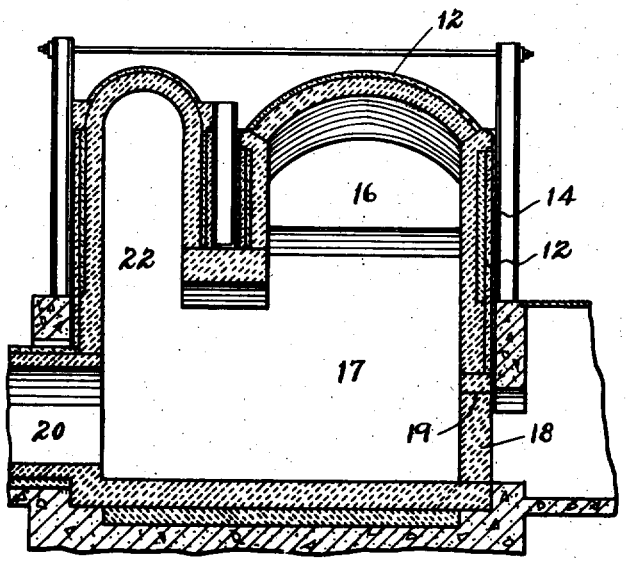
Fig. VI
INVENTOR
Fred H. Loftus
by Christy Christy & Wharton
his attorneys April 21, 1936. F. H. LOFTUS Re. 19,935
NONREVERSING OPEN HEARTH FURNACE
Original Filed Jan. 30, 1932 7 Sheets-Sheet 6
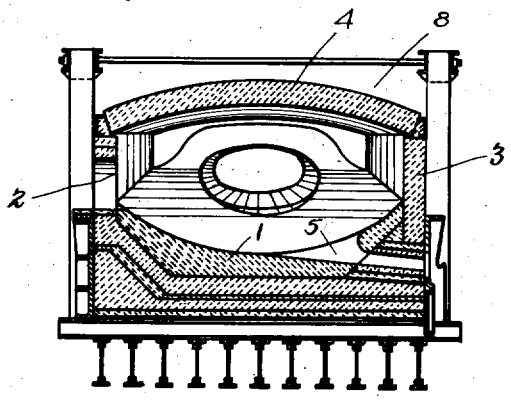
Fig. VII
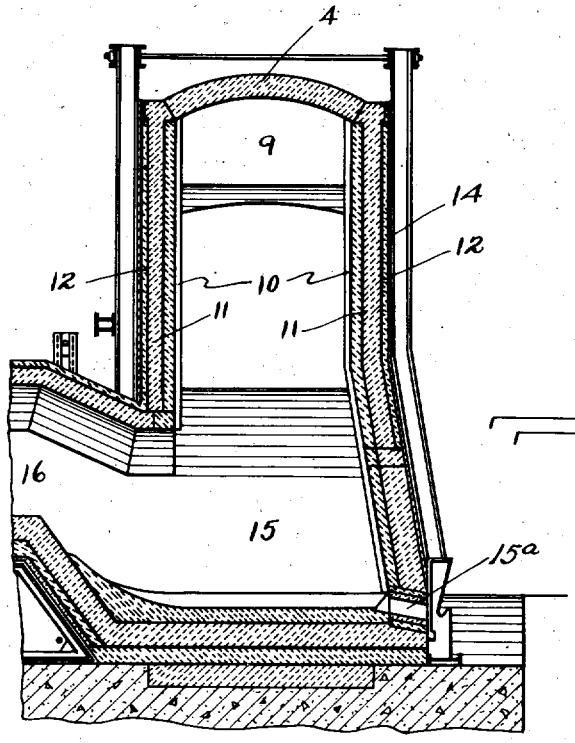
Fig. VIII
INVENTOR
Fred H. Loftus
by Christy Christy & Wharton
his attorneys April 21, 1936. F. H. LOFTUS Re. 19,935
NONREVERSING OPEN HEARTH FURNACE
Original Filed Jan. 30, 1932 7 Sheets-Sheet 7
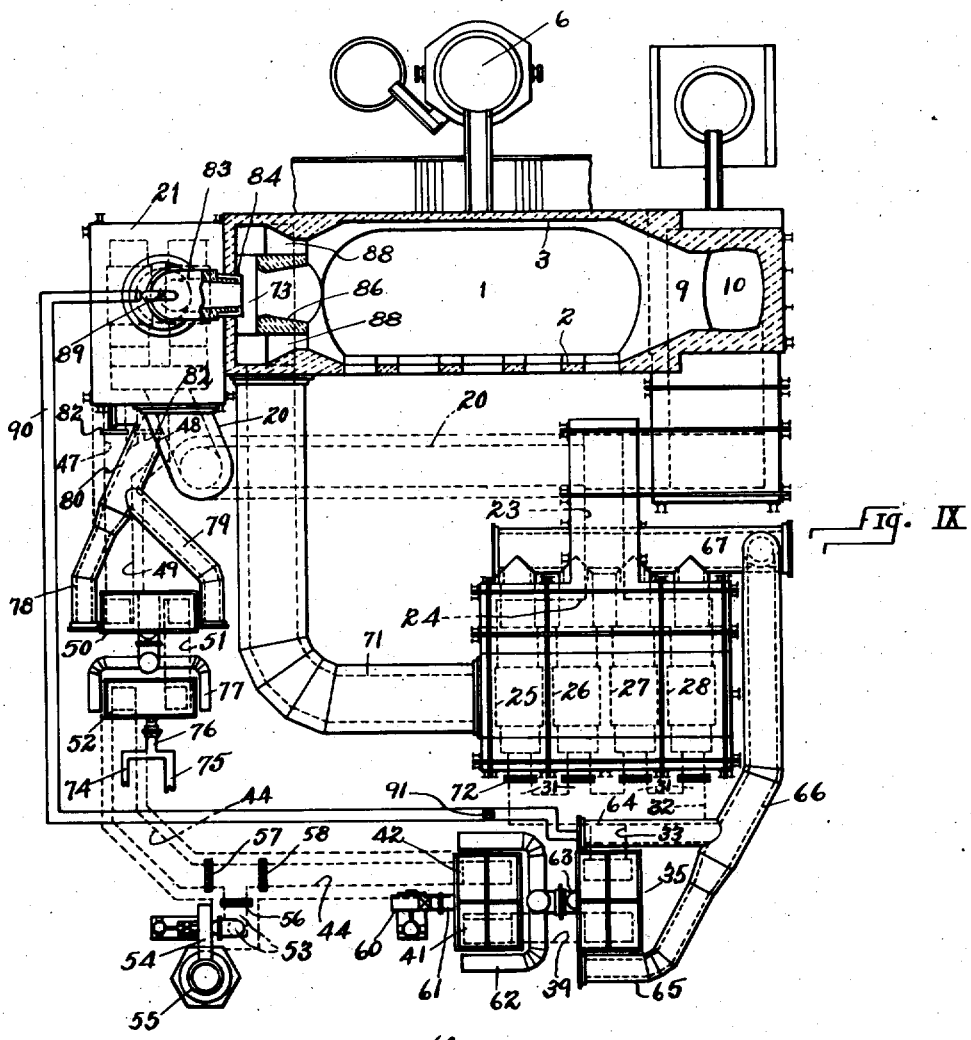
Fig. IX
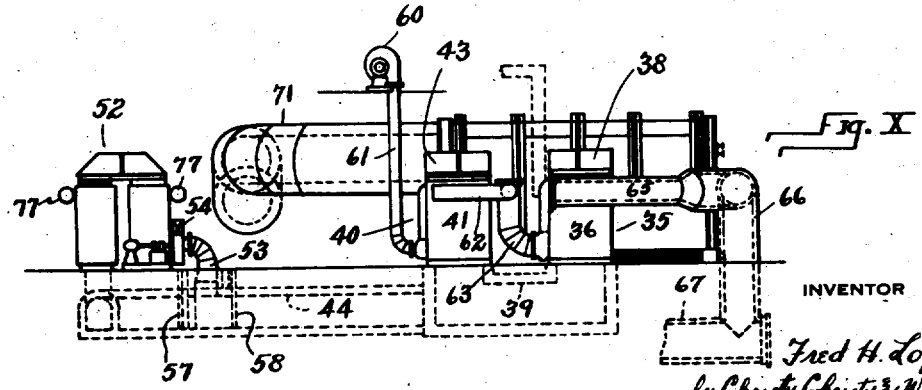
Fig. X
INVENTOR
Fred H. Loftus
by Christy Christy & Wharton
his attorneys Reissued Apr. 21, 1936

Re. 19,935

UNITED STATES PATENT OFFICE 19,935

NONREVERSING OPEN-HEARTH FURNACE

Fred H. Loftus, Mount Lebanon, Pa.

Original No. 2,028,290, dated January 21, 1936, Serial No. 589,935, January 30, 1932. Application for reissue February 28, 1936, Serial No. 67,097

11 Claims. (Cl. 263—15)

Figure 1:
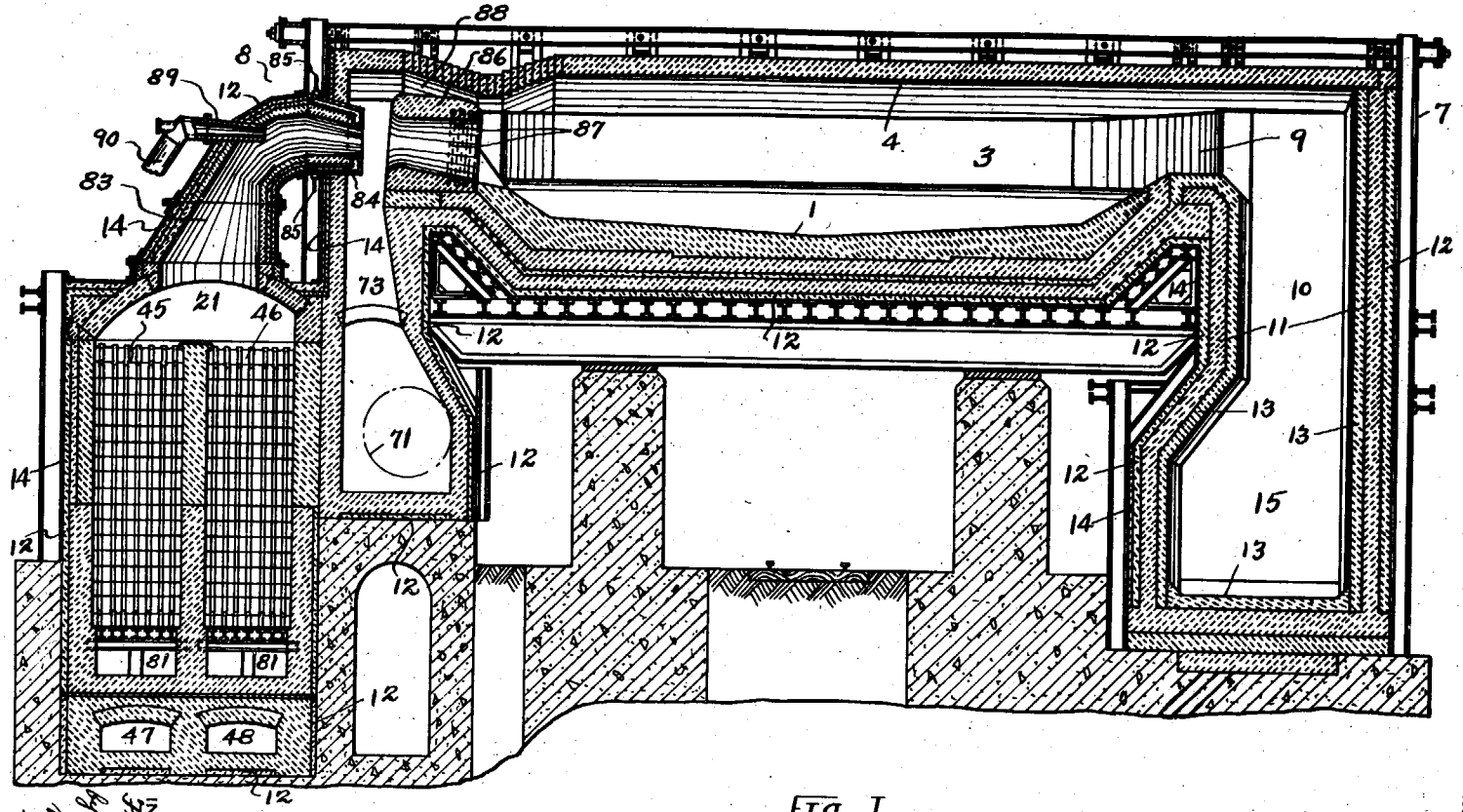
Figure 11:
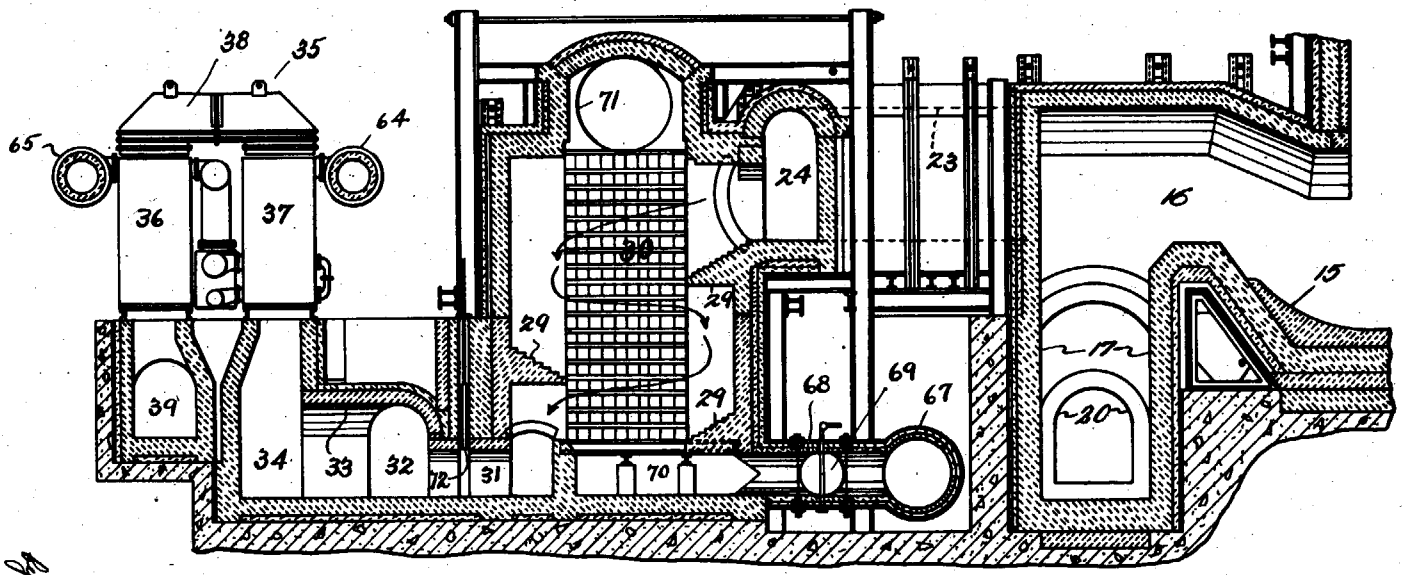

My invention relates to an open-hearth furnace for the production or refining of steel. In accordance with usual construction, an open-hearth furnace comprises a furnace chamber having ports at its opposite ends, serving alternately for the introduction of combustion-sustaining gases and for the escape of the products of combustion. A furnace of such character is known in the art as a reversing furnace.

While the ports at one end of the furnace are admitting fuel and air, the ports at the opposite end of the furnace are conducting away the hot products of combustion. At frequent intervals, during the operation of the furnace, the flow of gases is reversed, thereby causing the ports which were serving as the fuel and air introducing means to become the outlet for the escape of waste gases, and the ports which were serving as the outlet for hot waste gases to become the fuel and air inlet. Such reversing furnaces are provided with regenerative chambers, reversing valves, and flues interconnecting the respective ports, regenerative chambers and valves. Due to the necessity of reversing a regenerative type of furnace, these parts must also serve alternately as means for admitting fuel and air to the furnace ports and as means for conducting away the hot products of combustion.

Reversing furnaces are very low in efficiency, and are open to many objections in service. The reasons are manifold. For example, inasmuch as the opposed ports of a reversing furnace act alternately as the fuel-introducing and as the outlet passages of the furnace, the correct design for the fuel-introducing port, and the proper design for the outlet port are each modified, at the cost of efficiency, to provide a port structure having capacity for both functions required of it. The fuel-introducing ports, furthermore, are of necessity an elaborate and costly construction, and, of course, when serving as an outlet for the combustion products of the furnace, they are subjected to the extremely high temperatures of the waste gases. Accordingly, it is impossible to hold the port lines without extensive water-cooling—water-cooling being an expensive expedient, and a thing tending to reduce the efficiency of the furnace.

It is practically impossible to maintain the desired constant and uniform temperature conditions within a reversing furnace. Reasons for this are that the preheated air and fuel temperatures fluctuate between the beginning and the end of each period of operation between successive reversals, due to the fact that the checkerwork of the regenerators is hot at the beginning of such period and cools down during operation of the furnace until the next reversal takes place. This condition causes a loss in flame temperature which, together with the erosion of the ports and the plugging of the checkers (as the furnace campaign progresses), causes a material decrease in tonnage output and a proportionate increase in fuel consumption. There is a further loss in production due to the delays and time required for effecting each reversal of the furnace. Also it may be remarked that upon each reversal of the furnace the gaseous fuel within the preheating checkers at the time of reversing is carried to the stack and lost. These are merely a few of the many disadvantages and problems which are met in the operation of a reversing furnace, and for present purposes it is considered unnecessary to go into the matter further, save to mention that in a reversing furnace it is practically impossible to preheat a mixture of blast-furnace and coke-oven gases to sufficient temperature, so that introduced with air into the furnace their hydrocarbons will break down to produce a luminous flame. It is known that a luminous flame affords the best heat transfer between the burning gases and the ferrous charge of the furnace.

Primarily my invention is found in an open-hearth furnace which has heat-exchange equipment in novel association with the furnace ports, to permit the furnace to operate without reversing. The ports themselves are of particularly effective construction, and possess novelty in their organization with other parts to be described. The ports of my furnace are designed for co-operation with heat-exchange and gas cleaning equipment, to the end that my open-hearth furnace may be of non-reversing type, and will operate most effectively in overcoming the objections of a reversing furnace.

In the accompanying drawings a furnace structure embodying the principles of my invention is shown. Fig. I is a view of the furnace structure in vertical section, taken on the medial, longitudinal plane of the furnace hearth. Fig. II is a view, partly in plan from above and partly in horizontal section, of the furnace chamber and its associated ports. Fig. III is a view, partly in plan from above and partly in horizontal section, of the heat-exchange equipment which is associated with the outlet port of the furnace, that is, the right-hand end of the furnace in Fig. II. Fig. IV is a view in vertical section, taken on the planes indicated by the irregular line IV—IV in Fig. III.

Figs. V and VI are views in vertical section, taken on the planes V—V and VI—VI, respectively, of Fig. III. Fig. VII is a view in vertical section taken on the plane VII—VII of Fig. II; and Fig. VIII is a similar view taken on the plane VIII—VIII of Fig. II. Fig. IX is a more or less diagrammatic view, illustrating the furnace hearth in horizontal section, and showing the auxiliary equipment, which is associated with the furnace, in plan from above. And Fig. X is a view in side elevation of the equipment shown in Fig. IX.

Referring to the drawings, the reference numeral 1 denotes the hearth of my non-reversing furnace; 2 the front wall of the furnace chamber; 3 its back wall; 4 its roof; and 5 the usual tapping hole. An outlet port is constructed at one end 7 of the furnace for the escape of the hot products of combustion, while the opposite end 8 of the furnace comprises firing equipment, consisting of a primary air nozzle or tube 89 projecting into a gas nozzle 83. The gas nozzle 83 discharges into a tubular member 86, which is surrounded at its top and sides by an air passage 88, for the proper introduction of fuel and air to the furnace chamber. The arrangement of the firing system, which includes fuel and air preheating equipment, is instrumental in projecting a burning fuel column, at practically constant temperature and constant emissivity, over the hearth of the furnace.

Upon reference to Fig. II of the drawings it will be perceived that the principle of my invention permits the throat 9 of the outlet port to be of maximum area with respect to the furnace chamber. Accordingly the velocity of the escaping hot gases is minimum, and thus the erosive effect of the waste gases is so reduced as to be practically harmless to the defining walls of the passage.

From the throat 9 the waste gases enter a downcomer 10 built of refractory brick 11 and provided with a heat-insulating coating 12. The cross-sectional area of the downcomer 10 is greater than that of the throat 9, so that as the hot waste gases enter the downcomer their velocity is still further reduced. As will be more fully developed in the following specification, the operating temperatures of my furnace are far in excess of temperatures permissible in reversing furnaces, and at this point I may remark that throughout my structure I have provided extraordinary insulation, the refractory brick construction being provided with a steel encased insulating coating 12 and lined with facing 13 of super-refractory materials, known to the art. The insulating coating 12 is covered with metal plating 14, to protect the material and to prevent the infiltration of cold air. In brief, I endeavor in every practical way to maintain exceedingly high temperatures throughout the furnace system, and I avoid the otherwise damaging influences of the high temperatures by regulating the velocities of the waste gases rather than by operating at lower temperatures in the furnace chamber.

The waste gases, upon moving under reduced velocity down passage 10, enter a primary slag chamber 15. The chamber 15 is relatively large, and the velocity of the waste gases entering chamber 15 is further reduced. The waste gases are caused to change their direction of flow within the chamber 15, and to flow into an upwardly extending passage 16. These factors of gaseous flow all contribute to the removal of slag and dust particles from the hot waste gases, and the cleaning of these gases is a thing with which I have been much concerned, inasmuch as dust-ladened gases quickly foul the heat-exchange equipment. The temperatures prevailing in the chamber 15 are such that the deposited slag remains molten and may be drawn off by way of a tapping hole 15a (Fig. VIII).

Upon entering the passage 16 (the passage 16 being, as illustrated, of small cross-sectional area as compared with chamber 15) the velocity of the gases is increased. Under this increased velocity the gases sweep downward into a secondary chamber 17, wherein the velocity is again reduced, and a secondary cleansing of the gases is effected. A bulkhead 18 normally closes opening 19 (Fig. VI) through which access is had for the removal of the dust and slag collecting in chamber 17. In leaving secondary chamber 17 the cleansed gases divide, a portion of the gases flowing through conduit 20 to a heat exchanger 21, and the remaining portion of the gases moving upward through passage 22. As will later be explained in detail, the heat exchanger 21 effects the final preheating of the gaseous fuel which is fed to the inlet port 8 of the furnace.

Upon moving vertically through passage 22 the cleansed waste gases flow horizontally along passage 23 and enter a manifold 24. From manifold 24 the gases flow into the several heat exchange batteries 25, 26, 27, and 28. The gases enter the batteries adjacent their top, and flow downward, as indicated by the arrows in Fig. IV. Baffles 29 assist in effecting such flow of the waste gases. It will be understood that the elements 30 of each battery are built of hollow refractory tiles, arranged to form a plurality of vertical and horizontal passages. The waste gases flow through the horizontal passages externally of the walls forming the vertical passages, through which vertical passages the air to be preheated is caused to flow upwardly. The subject of preheating air within the batteries 25, 26, 27, and 28 is hereinafter described.

Upon leaving the heat exchange batteries previously referred to, the waste gases flow by way of passages 31 into a manifold chamber 32, whence in united stream the gases pass through an opening 33 and into an uptake 34, which uptake communicates at its upper end with a preheater 35. The preheater 35 includes two heat-exchange batteries 36 and 37 interconnected by a conduit 38 (Fig. IV). The waste gases flow upward through battery 37 and downward through battery 36, whence the gases enter a passage 39. Passage 39 communicates with still another preheater 40. Preheater 40 is similar to preheater 35, preheater 40 comprising two batteries 41 and 42 interconnected by a header 43, cf. Figs. III, IX and X. The waste gases flowing from passage 39 move upward through battery 41, downward through battery 42, and into exhaust flue 44.

The hot waste gases, which are by-passed into conduit 20, enter the heat exchanger 21, which includes two batteries 45 and 46 of refractory tile elements (Fig. I). The waste gases enter adjacent the top of the heat exchanger and flow downward similar to the flow of gases described in the heat exchange batteries 25—28 (Fig. IV). Upon reaching the bottom of the heat exchanger 21 the gases find outlet through two passages 47 and 48 which open into a main passage 49 (Figs. I and IX). From main passage 49 the waste gases flow through preheaters 50 and 52, substantially in the manner the waste gases pass through preheaters 35 and 40. Leaving preheater 52 the gases proceed into the exhaust flue 44.

The preheaters 35 and 50 are constructed of heat-resisting metal, and the preheaters 40 and 52 may be built of ordinary steel plates. As the engineer will understand, these preheaters comprise walled passages; the hot waste gases flow in contact with the one side of each wall, while the combustion-sustaining fluid to be heated flows in contact with the other side of the wall. So, heat transfer is effected between the waste gases and the combustion-sustaining gases. As has been mentioned, each of the preheater units 35, 40, 50, 52 includes companion batteries connected in series. The arrangement of the preheater units in series is of great practical importance, in that the required heat-exchange surface may be obtained without destroying the desired velocities of flow within the preheater units.

The exhaust passage 44 is, by means of a conduit 53, connected with an exhaust fan 54, and fan 54 communicates with the stack 55 of the furnace. The waste gases reach the fan 54 at a temperature of approximately 350° F. This relatively low temperature of the waste gases indicates the efficiency of heat exchange in the preheating system, and is particularly remarkable when it is considered that my furnace operates at unusually high temperature and has all of its waste gas passages well insulated.

The valves 57 and 58 in the exhaust flue 44 serve to regulate the relative quantities of waste gases flowing through the air heat exchangers (25, 26, 27, 28, 35, 40) and the fuel heat exchangers (21, 50, 52). Accordingly, the temperatures of the fuel and air for combustion may be balanced or established in any desired ratio. The temperatures of the gaseous fuel and of the air for combustion delivered to the furnace may be severally determined and maintained to a nicety, the system being particularly adapted for automatic temperature-controlling equipment. The valve 56, in controlling the passage to the fan and stack, admits of regulation of the draft; i. e. the furnace operating pressure. Having described the characteristics of my furnace which admit of furnace operation under exceedingly high temperatures, and having disclosed the auxiliary equipment which in particularly effective manner handles the waste gases of the furnace and makes possible the high temperature furnace operation, I shall now proceed with the matter of fuel introduction.

The air for combustion of fuel within the furnace is supplied under pressure to the primary preheater 40. Conveniently, a power fan 60 delivers the air through pipe 61 to the preheater 40, at a point adjacent its bottom. The air flows through batteries 41, 42 of preheater 40 in a direction counter to the flow of waste gas and enters a bustle pipe 62, whence it is conducted by a pipe 63 into the secondary preheater 35. The primary and secondary preheaters 40, 35 are arranged in series, to the end that proper velocities of the air may be maintained, while the temperature of the air is raised to about 1000° F. The air is directed from the secondary preheater to the third stage air preheating unit by means of side pipes 64, 65 which are joined into a single main 66, terminating in a header pipe 67, which communicates with each battery (25, 26, 27, 28) of the heat exchanger. That is to say, each battery of the third stage unit is connected by means of a passage 68 (Figs. III and IV) with the header 67. The passages 68 are severally provided with regulating valves 69, for controlling the pressure and volume of the air entering chambers 70 beneath the several batteries (25, 26, 27, 28), from which chambers 70 the air rises through the vertical passages in the tile structure (previously described), whence it flows into a main 71.

The waste gas outlets 31 of the tile heat exchanger are each provided with a valve 72 (Figs. III and IV), whereby the relative quantities of waste gases flowing through each tile battery of heat exchanger are adjustable. Of course, the valves 69 control the relative quantities of air entering the several compartments or batteries of the heat exchanger. It is to enhance such precise control over the waste gases and air that I have provided my tile heat exchanger in a plurality of batteries (25, 26, 27, 28), each of small cross-sectional area in the horizontal. Furthermore, in providing tile batteries of such small cross-section, I overcome to large degree the problem of differential expansion and contraction within the body of built-up tiles. By supplying the air to the heat exchanger at 1000° F., I so far as is practical maintain a minimum temperature differential between the top and bottom passes of the tile, and between the air and waste gases within the tile. Thus in heating up at the start of furnace operation, and under conditions of operation, I provide for more uniform expansion and eliminate the fracturing of the tile elements. Additionally, my system of valves 69, 72 permits substantial equalization of the waste gas and air pressures throughout the heat exchanger, and such balancing of pressures prevents leakage through the tile walls and aids in the realization of the good results indicated. By means of the described control of both the waste gases and the air, I am able to operate successfully over long and continued periods of time, without failure on the part of the tile heat exchanger.

The air is preheated to approximately 2500° F. in the third stage heat exchange batteries 25, 26, 27, 28, which batteries are of practical height, to supply by buoyancy sufficient energy to the air, to effect its flow through main 71, up passage 73 (Fig. I), and into the furnace.

The fuel for the furnace is delivered under pressure to the primary fuel preheater 52. Since in this case the fuel comprises a mixture of coke-oven and blast-furnace gases, the coke-oven gas is admitted through a line 74, and the blast-furnace gas is admitted through a line 75 (Fig. IX) into the inlet 76 of the primary fuel preheater. The mixed fuel gases flow through preheater 52, pass therefrom and enter a bustle pipe 77, whence they are introduced to the secondary preheater 50. Upon issuing from the secondary preheater 50, the heated fuel gases enter lateral pipes 78, 79 and flow into fuel main 80. In general the theory of operation of the fuel preheaters 52, 50 is the same as that of the air preheaters 40, 35; that is. the fuel preheaters 52, 50 are connected in series, the fuel gases flow in a direction counter to the flow of the waste gases in each, and are preheated (in this case) to a temperature of 1000° F.

In a manner generally similar to that in which the air for combustion is introduced into the several tile batteries (25, 26, 27, 28) of the air heat exchanger, the preheated fuel gases flow from the main 80 (Fig. IX) and are introduced to chambers 81 (Fig. I) beneath the tile batteries 45, 46 in the third stage fuel preheater or fuel heat exchanger 21. The gaseous fuel flows from the main 80 by way of valved passages (not shown), much the same as the passages 68 associated with the air heat exchanger, and the waste gas outlets 47, 48 of the fuel heat exchanger 21 are provided with valves 82, much the same as the waste gas outlets 31 of the air heat exchanger are provided with valves 72. Accordingly, it will be understood that the control of temperatures, pressures and other conditions, may be effected in the fuel heat exchanger 21 in substantially the same manner as they are effected in the air preheating system. The fuel heat exchanger (21) is provided in a plurality of batteries of small cross-sectional area in the horizontal and the fuel is supplied at a temperature of 1000° F. in a manner generally similar to that in which preheated air is fed to the tile heat exchanger in the air preheating system, and for the purposes described thereunder.

The fuel gas is preheated to approximately 2500° F. in the third stage heat exchange batteries 45, 46. The batteries 45, 46, as the batteries 25—28, are of practical height to supply, by buoyancy, sufficient energy to the fuel, to effect its flow through gas nozzle 83 at such velocity as to impart direction to the fuel column, and to entrain a portion of the combustion-supporting air for the purpose of producing proper flame quality and temperature in the furnace chamber. The fuel heat exchanger 21 is positioned immediately below the nozzle 83, which nozzle directs the fuel into the port 8 of the furnace. This organization of the parts 21, 83, and their particular association with the port structure 8, permits the buoyancy of the fuel gases to be utilized to the fullest extent. The position of the fuel heat exchanger is important from the standpoint of eliminating the possibility of trapping explosive gaseous mixtures, which in other structures might become trapped in the heat exchanger, or in the passage leading to the gas nozzle or port. Furthermore, my compact structure reduces the escape of hydrogen gas, it being understood that the escape of hydrogen is difficult to prevent when the fuel comprises mixed gases.

The mouth of the nozzle 83 is elliptical in shape, the major axis of the ellipse extending horizontally. Advantageously a hollow metal jacket 84 is provided for the nozzle, and pipes 85 are provided to maintain a circulation of cooling water therein, whereby the mouth of the nozzle is adapted to withstand the great heat generated in its vicinity. The fuel gases, at a temperature of 2500° F., stream from the elliptical mouth of nozzle 83 and enter the tubular member 86. The throat of member 86 is elliptical in cross-section, and lies in axial alignment with the elliptical mouth of nozzle 83. At one end the tubular member opens into the furnace chamber, and at its other end opens above the air uptake 73 and at an interval from the mouth of nozzle 83. Conveniently, water-cooling pipes 87 (Fig. I) are included in the end of member 86 nearest the furnace chamber, the pipes 87 providing a supporting frame, as well as cooling means, for the super-refractory material, of which the tubular member (86) is constructed. Above and at the sides of the member 86, the passage 88 extends from the air uptake 73 toward the furnace chamber..

The nozzle 83 projects a column of preheated fuel into the tubular member 86; this column of fuel entrains preheated air from uptake 73, and while moving through member 86 the fuel and entrained air are partially mixed. The nozzle 83 and tubular member 86 are so designed as to introduce into the furnace a column of partially mixed air and fuel—the volumes of air and fuel being of such relative proportions as to develop the desired flame temperature at the inlet end (8) of the furnace. The velocity and cross section of the partially mixed column of fuel (issuing from tubular member 86) and air (issuing from the passage 88) are so determined, and the passage 88 and member 86 are so directed, that the diffusion or the mixing of the air and fuel column occurs progressively across the furnace chamber. The progressive diffusion of the gases is such that the fuel column issuing from the member 86 travels with uniform intensity over the entire hearth. This is accomplished without great use of a booster.

I contemplate, however, the installation of a booster, this being desirable at the beginning of a heat, and to a lesser extent during continuous furnace operation. The booster may be in the form of a small, elliptical-mounted tube 89, extending into the nozzle 83 on the axis common to the tubular member 86 and the mouth of the nozzle. A line 90 connects the tube 89 with the outlet pipe 64 of the secondary air preheater 35; a valve 91 (Fig. IX) is included in line 90, and primary air, at a temperature of approximately 1000° F., may in regulated quantities and under superior pressure be injected into the column of gas projected from the nozzle 83. The so-called primary air introduced by the tube 89 increases the percentage of air entrained with the fuel flowing into the tubular member 86, and produces a greater mixing of air and fuel. The services of the tube 89 are, as above mentioned, particularly desirable and advantageous during the melting period of a "heat", it being necessary during such period to counteract the dampening effect of the cold charge upon the combustion process. Another valuable characteristic of the primary air is that it serves in regulating the intensity of the flame which travels from one end of the furnace chamber to the other.

The passage 88 also serves to maintain a screen of ingoing air between the flame and the roof of the firing port 8, and, therefore, the roof is not subjected to the intense heat of the fuel column. Accordingly, the exposed wall areas of the furnace may be scientifically designed and well insulated against heat losses. The roof section of the furnace immediately over the tubular member 86 may be, and conveniently is, constructed in the form of a removable bung (not shown), whereby access may be readily had, to effect repair of the nose of member 86.

The discharge end of the furnace is arranged with converging side walls for the purpose of "drafting" the burning fuel away from the main walls 2 and 3. The downtake 10 is of maximum effective area, to slow down the velocity of the waste gases to a point where their wall-eroding tendencies are minimized. The temperatures of the waste gases are adapted to maintain the slag collected in the primary slag pocket 16 in molten condition, whereupon the slag collected in the pocket may be quickly removed by tapping. This eliminates the delays and expense in furnace operation, necessary (according to old practice) for blasting and digging out the slag chambers. The particular organization of air and fuel preheating equipment affords a desideratum long sought in installations where a mixture of blast-furnace gas and coke-oven gas is employed as fuel. That is to say, in such an installation the art has long been desirous of obtaining, as my structure obtains, a sufficient breaking down of the hydrocarbons of the fuel, to produce a flame of high luminosity and emissivity.

In a non-reversing furnace of the nature described above, the firing port, the exhaust port, the gas-cleansing facilities, the heat exchangers, and, in brief, all flues and associated equipment may be specifically designed each for their sole-intended service. This factor renders it possible to obtain advantages not obtainable in a reversing furnace. From the standpoint of tonnage output, fuel economy, maintenance, operating labor, etc., my structure is superior, and in addition more readily lends itself to automatic furnace control. I consider that the continuity of furnace operation, and the high temperatures of operation, obtained in my structure, are factors largely accounting for the advantages recited.

The best reversing open-hearth furnaces give efficiencies varying from seventeen to twenty-three per cent., while my nonreversing furnace is capable of efficiencies which vary from thirty-four to forty-six per cent.

In summary I may say that for years the experimental and research work of the art has been directed to reversing open-hearth furnaces. The research has involved considerations of port structures, burners, heat exchangers, heat insulation, mechanical draft, automatic control of the furnace pressures, automatic temperature control, means for effecting automatic reversals of the furnace, and other such means, all of which pertained to improvements in the structure and operation of reversing furnaces; whereas, in my invention I have started at the beginning, so to speak, and have evolved an improved furnace based on concepts which either have been long abandoned or have never been perfected in open-hearth practice.

I claim as my invention:

1. In a uni-directional open-hearth furnace, the combination of a port at one end of the furnace designed solely for the introduction of combustion-sustaining fluid, and a port at the opposite end of the furnace designed solely for the escape of waste gases, a waste gas system associated with said furnace, which system includes a primary waste gas cleansing chamber, a downtake connecting the outlet port of the furnace with said primary chamber, said primary chamber being of large effective area as compared with said downtake, whereby gases enter said primary chamber from said downtake at greatly reduced velocity, an outlet from said chamber, which outlet is so disposed with respect to the entrance to the chamber that the waste gases are caused to flow through the chamber and to flow angularly therefrom, a secondary cleansing chamber, an upwardly extending passage connecting the primary and secondary cleansing chambers, said secondary chamber being of relatively large effective area with respect to said passage, a uni-directional hollow tile heat exchanges, and a passage for the waste gases from said secondary chamber to said heat exchanger.

2. In a uni-directional open-hearth furnace, the combination of a firing port at one end of the furnace and an outlet port at the opposite end thereof, a nozzle for the introduction of preheated gaseous fuel to said firing port, and a heat exchanger immediately below said nozzle comprising a battery of tile forming vertical passages for the continuous and uni-directional movement of fuel gases upward through the heat exchanger and forming passages for the continuous and uni-directional movement of waste gases downward through the heat exchanger.

3. In a uni-directional open-hearth furnace, the combination of a firing port at one end of the furnace and an outlet port at the opposite end thereof, a nozzle for the introduction of preheated gaseous fuel to said firing port, a heat exchanger below said nozzle comprising a battery of tile forming passages for the continuous and uni-directional movement of fuel gases upward through the heat exchanger and forming passages for the continuous and uni-directional movement of waste gases without said fuel gas passages, and a heat exchanger constructed of metal connected to discharge preheated fuel gas to the base of said tile battery.

4. In a uni-directional open-hearth furnace, the combination of a firing port at one end of the furnace and an outlet port at the opposite end thereof, a nozzle for the introduction of preheated gaseous fuel to said firing port, a heat exchanger below said nozzle comprising a battery of tile forming passages for the continuous and uni-directional movement of fuel gases upward through the heat exchanger and forming passages for the continuous and uni-directional movement of waste gases without said fuel gas passages, and a heat exchanger constructed of metal connected to discharge preheated fuel gas to the base of said tile battery, together with passages for conducting waste gases from the outlet port of the furnace, first to the tile heat exchanger and then to the metal heat exchanger.

5. In a uni-directional open-hearth furnace, the combination of a firing port at one end of the furnace and an outlet port at the opposite end of the furnace, a heat exchanger including one-way passages for air, and passages for waste gases; a heat exchanger including one-way passages for fuel, and passages for waste gases; and a passage extending from said outlet port and communicating with the waste gas passages in said air and fuel heat exchangers, and means for effecting divided flow of the waste gases advancing from the furnace in one-way and continuous streams through said heat exchangers.

6. In a uni-directional open-hearth furnace, the combination of a firing port at one end of the furnace and an outlet port at the opposite end of the furnace, a heat exchanger including one-way passages for air, and passages for waste gases; a gas-cleansing chamber, a passage from said outlet port to said gas-cleansing chamber, a passage from said chamber to said heat exchanger for introducing the waste gases advancing from the furnace in one-way and continuous streams through the waste gas passages in said heat exchanger, the relative effective areas of said outlet port, said cleansing chamber, and the passages communicating therewith, being so determined that the waste gases streaming from the furnace on their way to said heat exchanger are alternately accelerated and retarded, and means for introducing air in one-way streams through the air passages of said heat exchanger, and a one-way air passage from the heat exchanger to the firing port of said furnace.

7. In a uni-directional furnace, the combination of a firing port at one end of the furnace and an outlet port at the opposite end thereof, a preheating system including a tile preheater connected in series with metallic preheaters, a one-way passage for the continuous flow of waste gases from said outlet port to said tile preheater and thence to said metallic preheaters, and a one-way passage for the flow of substantially all the air for combustion in the furnace in continuous streams through said metallic preheaters and thence through said tile preheater, and a one-way air passage from said tile preheater to said firing port.

8. In a uni-directional furnace, the combination of a firing port at one end of the furnace and an outlet port at the opposite end thereof, a preheating system including a tile preheater connected in series with metallic preheaters, said metallic preheaters including members of specialized heat-resisting metal and members of less specialized metal, a passage for the one-way continuous flow of waste gases from said outlet port to said tile preheater and thence to said metallic preheaters, and a one-way passage for introducing substantially all the air for combustion in the furnace in continuous streams through said metallic preheaters and thence through said tile preheater, and a one-way air passage from said tile preheater to said firing port.

9. In a uni-directional open-hearth furnace, the combination of a firing port at one end of the furnace and an outlet port at the opposite end thereof, a preheating system including a tile preheater connected in series with a metallic preheater, a one-way passage including gas-cleansing chambers extending from said outlet port to said tile preheater, and a one-way flue connecting said metallic preheaters to an exhaust, whereby waste gases flow continuously in one-way streams through said passage, preheaters, and flue; a one-way inlet in said metallic preheater for substantially all the air for combustion in the furnace, a one-way air passage extending from said metallic preheater to said tile preheater, a one-way air passage extending from the tile preheater to the firing port of the furnace, whereby the air flows continuously in one-way streams through said passages and preheaters, and means for the introduction of fuel to said firing port.

10. In a uni-directional open-hearth furnace, the combination of a firing port at one end of the furnace and an outlet port at the opposite end thereof, air-preheating equipment including a tile preheater connected in series with metallic preheaters, a one-way waste gas passage connected to said tile preheater, a one-way flue connecting said metallic preheaters to an exhaust, an air inlet in said metallic preheater for substantially all the air for combustion in the furnace, an air passage extending from said metallic preheaters to said tile preheater, a one-way passage extending from said tile preheater to the firing port of the furnace, whereby the air flows continuously in one-way streams through said passages and preheaters; fuel preheating equipment comprising a tile preheater, a one-way passage for waste gases opening into said tile preheater, metallic preheaters connected in series to said tile preheater and a flue connecting said metallic preheaters to an exhaust, a one-way fuel inlet in said metallic preheaters, a fuel passage extending from said metallic preheaters to said tile preheater, a one-way fuel passage from said tile preheater to said firing port, whereby the fuel flows continuously in one-way streams through said passages and preheaters; and gas-cleansing chambers associated with the outlet port of the furnace, and connections from said gas-cleansing chambers to the said waste gas passages which extend to the air preheating equipment and to the fuel preheating equipment, whereby the waste gases flow in divided, one-way, and continuous streams through both the air and the fuel preheating equipment.

11. In a uni-directional open-hearth furnace, the combination of a firing port at one end of the furnace and an outlet port at the opposite end of the furnace, a heat exchanger comprising a battery of compartments including heat-exchanging bodies providing one-way passages for air, and one-way passages for waste gases; means for conducting the waste gases in continuous stream from the outlet port of the furnace to said compartments, means for dividing the continuous stream of waste gases and apportioning a fractional part of the stream to each compartment of the heat exchanger, whereby in divided stream the waste gases flow continuously and in one-way courses through the heat-exchanging bodies, means for feeding air in continuous and one-way streams through said heat exchanger, and a one-way air passage extending from said heat-exchanger to the firing port of the furnace.

FRED H. LOFTUS.